Nov. 24, 1925.  1,563,295
J. N. A. SAUER
MANUFACTURING DECOLORIZING CARBON
Filed Feb. 27, 1920    4 Sheets-Sheet 3

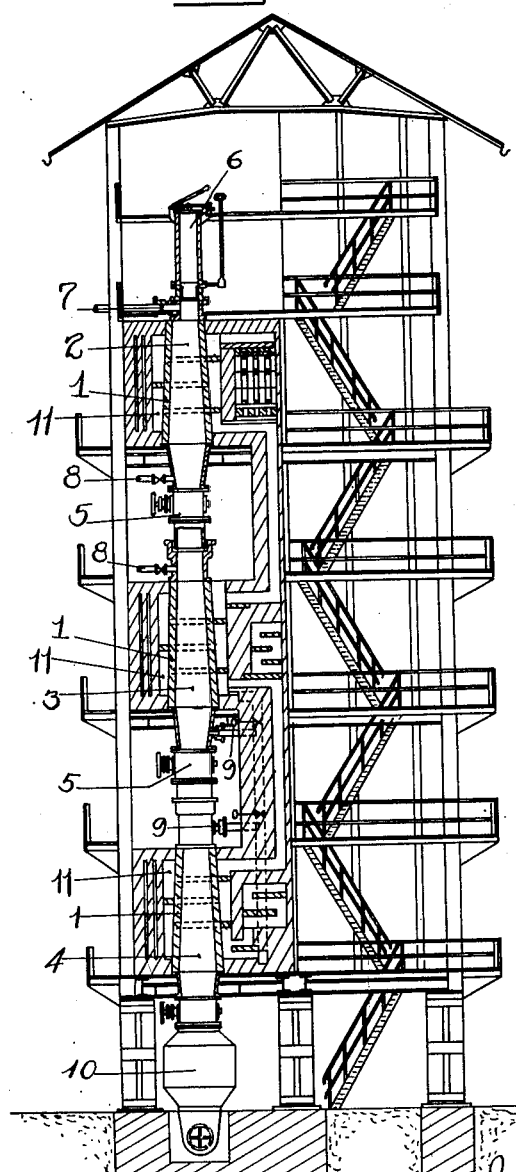

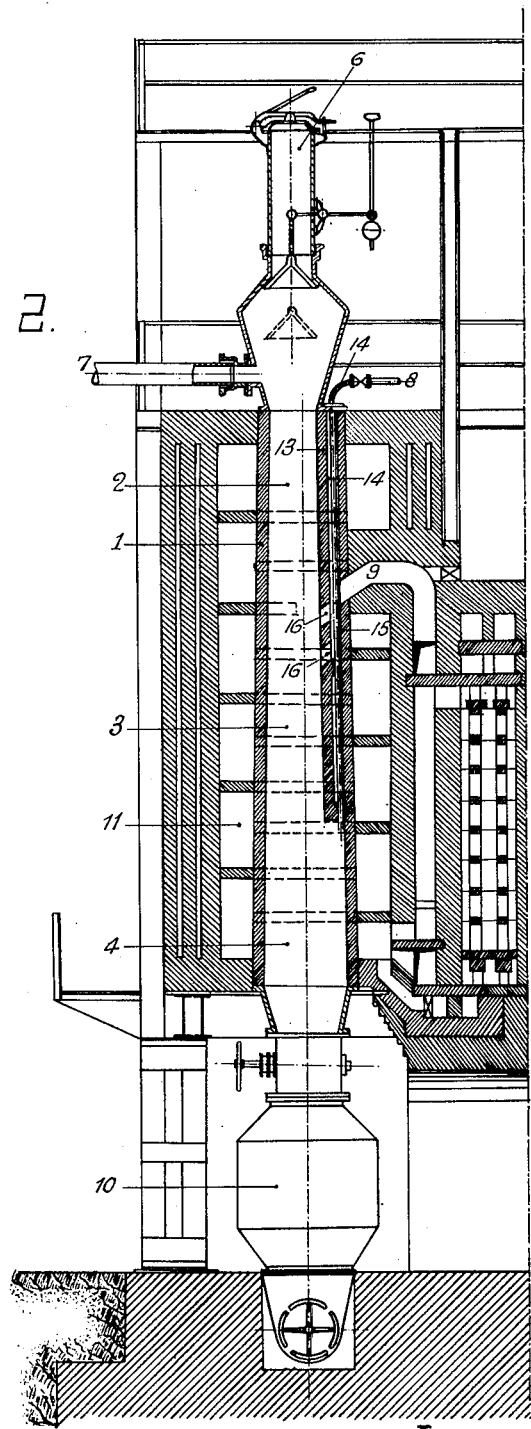
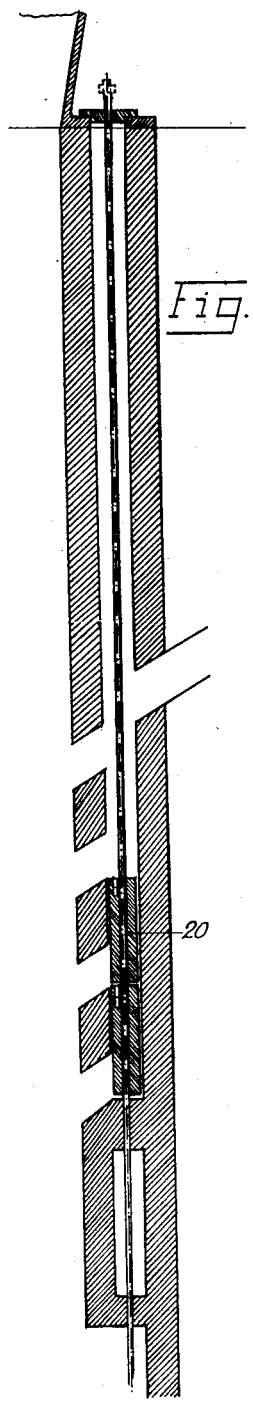

Inventor
Johan N.A. Sauer  by  John Lotka
                       Attorney.

Nov. 24, 1925.

J. N. A. SAUER 1,563,295

MANUFACTURING DECOLORIZING CARBON

Filed Feb. 27, 1920   4 Sheets-Sheet 4

Inventor
Johan N.A. Sauer
by John Lotka
Attorney.

Patented Nov. 24, 1925.

1,563,295

UNITED STATES PATENT OFFICE.

JOHAN NICOLAAS ADOLF SAUER, OF AMSTERDAM, NETHERLANDS.

MANUFACTURING DECOLORIZING CARBON.

Application filed February 27, 1920. Serial No. 361,742.

*To all whom it may concern:*

Be it known that I, JOHAN NICOLAAS ADOLF SAUER, of Amsterdam, Netherlands, a subject of the Queen of the Netherlands, have invented certain new and useful Improvements in Manufacturing Decolorizing Carbon, of which the following is a specification.

The process of the present application relates to an improved process for producing decolorizing carbon.

The designation "de-colorizing carbon" is applied to an active, porous carbon having greater absorptive capacity than ordinary charcoal and derived from organic substances of vegetable, animal or carbonaceous mineral origin.

Heretofore the process of manufacturing decolorizing carbon comprised various operations and phases or stages, including the following:

(*a*) Preliminary dry distillation at a comparatively low temperature, with or without the introduction of gases for the purpose, among others, of carrying away condensable gases from which valuable by-products are obtainable. If wood is used, this stage produces what is known as charcoal.

(*b*) Heating the material, after or without previous dry distillation proper, to a high temperature, with or without introduction or evolution of gases, to produce active decolorizing carbon. This I term the carbonizing stage or activation process.

(*c*) Heating the material after the distilling and active carbonization process to a higher temperature, that is, a temperature for example, of the order of 1500° C., that is to say, higher than that used in the active carbonization or second stage, with or without injection or internal evolution of gases to produce final activation, carbonization or burning.

These operations in the manufacture of decolorizing carbon have hitherto been performed in separate independent stages of manufacture. The separation has, in most cases, though not always, been so complete that the preliminary distillation process has taken place at a different place, in another factory, for example in one used for the production of ordinary charcoal and of by-products derived from the condensable gases of distillation. The other two operations have likewise been separate from each other, that is to say, being performed in separate appliances, though at the same place or factory.

The independence of the two first operations and the final burning operation from each other requires that, after completion of the first two stages or operations in suitable retorts, the material be transferred from these retorts to another apparatus for final burning or carbonization. This, of course, causes, among other disadvantages, loss of time and heat, and may cause loss of material through oxidation and waste.

The object of the present invention is to afford a process of producing so-called decolorizing carbon from organic matter of vegetable, animal or carbonaceous mineral origin, characterized in that either all the above mentioned operations, or some of them, are performed in suitable combination in a single retort, or in a retort system constituting a single unit, so that the first process of distillation, the carbonizing or second stage, and the final burning process can all be performed in uninterrupted succession.

One technical advantage secured by the invention is that the production of the decolorizing carbon can be directly associated with the production of valuable by-products from the condensable gases derived from the raw material, so that a single process of manufacture yields by-products, such as those, for example, which are obtained by the usual process of distilling wood and also decolorizing carbon, which has hitherto been produced by a process distinct from that of wood distillation.

In other words, the process of producing decolorizing carbon may, by the invention, be developed into a process yielding valuable by-products. However, the process may be performed without including the distilling process which yields by-products, and in that case the characteristic of the invention is that the carbonization and the final burning process are performed as a continuous process wherein these two operations succeed each other.

The operations may proceed in any of the following ways:—

(*a*) All the operations may take place in a single retort, having appropriate intercommunicating chambers or heating zones for the said operations.

(b) The primary distillation and the carbonization process may take place together in one retort.

(c) The carbonization and the final burning processes may take place together in one retort.

(d) The distilling process may take place in one retort, and the carbonization and final burning operations in another retort associated with the first retort in a single unit of apparatus.

(e) The distilling process and the carbonization process may take place in one retort, and the final burning process in another retort associated with the first retort in a single unit.

(f) Each operation may take place in a separate retort, all the retorts being associated to form a single unit of apparatus.

In each of these modes of procedure it is essential that till completion of the entire process, the material is not removed from the single retort or group of associated retorts used, and that the various stages follow each other in direct succession; also that the transfer of the material from one retort to the next (if another retort is used) is direct and immediate.

The non-condensable gases obtained in the first stage and the gases obtained in the carbonization and in the final burning stage (hereinafter to be referred to as retort gases) may be separately or collectively used to heat the retorts wherein the various processes take place.

As distinguished from the "retort gases" the gases or vapors introduced into the retorts will hereinafter generally be designated "added gases."

The distinctive nature of the invention as compared with the previous processes is also illustrated by the following fact:—

If the material treated by the old methods is of vegetable origin, for example wood or peat, or charcoal or carbonized peat, there are in general two alternative modes of operation.

In one of these modes of operation finished charcoal or carbonized peat is used, which may have been produced in a furnace or by a retort process. In this case there is of course no production of by-products. If the material was prepared in a retort, the condensable by-products have already been separated out. In the beehive furnace process there is no systematic recovery of by-products. Accordingly, the process of manufacturing de-colorizing carbon is confined to the treatment by further carbonization of the charcoal or carbonized peat by heat, generally with addition of gases and with or without subsequent final burning.

In the second mode of operation the material used is, for example, broken up wood or peat. With the old processes, systematic recovery of condensable by-products is in this case also impracticable, because the material is so quickly raised to a high temperature that the products of distillation are decomposed. The appliances heretofore used for the production of decolorizing carbon are in no way designed or adapted for the systematic separation or recovery of condensable by-products in a continuous manner.

A recognized disadvantage of the distilling processes hitherto used for producing de-colorizing carbon lies in the fact that the distillation products or gases evolved are led away collectively, either exclusively at the top or exclusively at the bottom of the retort, so that systematic recovery of by-products is impracticable.

In the present invention the organic material, such as wood, peat or the like, or other organic material, of vegetable, animal or mineral origin, which may be soaked, impregnated, mixed or otherwise treated with acid, lye, or other various solutions of chemicals, or mixed or treated with dry materials of various kinds, is subjected in a single retort, or in retorts associated in a single unit, to gradually increasing temperature, and the products of distillation or retort gases can be led away in "fractions." The products of distillation evolved at the lower temperatures, at the upper part of the retort, are led away separately, not decomposed or only slightly decomposed, and as free as possible from other retort gases. This enables by-products to be systematically recovered.

The hot retort gases evolved during the carbonization and final "burning" processes are also led away separately. These gases may be used for heating the retort or for other purposes.

They may be used in various ways, as for example:—

(1) For the final burning process.

(2) For continuing the carbonization after the distilling or preliminary carbonizing process, or for direct carbonization of raw material at high temperature in the carbonizing and burning stages.

(3) For the first process of distillation for recovery of by-products.

(4) For any other convenient purpose, for instance, for superheating steam.

According to whether the work is done in two or more stages, and according to whether these stages are separated vertically, horizontally or in any other direction in relation to the retort or retort system, the retort is vertically, horizontally or in any other position surrounded by a series of heating or combustion chambers. These chambers are heated as required at the several parts of the retort or retorts, by the introduction of the retort gases with air for combustion, which may be subjected to preliminary heating.

Gases, superheated or otherwise, such as air, steam, flue gases, carbon dioxide, carbon monoxide, hydrogen or chlorine etc., may be introduced into the retort at atmospheric or higher pressure.

The introduction of the gases into the several chambers or zones of the retort [distilling (first stage), active carbonizing (second stage) and final burning (third or final) zones] takes place at the appropriate parts, and the combustible retort gases are led away at the appropriate parts.

Where gases are introduced at the top, the combustible retort gases are led away at the bottom, and vice versa.

Combustible retort gases are produced, as is known, when for instance, steam, air, carbon dioxide, carbon monoxide or hydrogen are introduced into the incandescent charge. These retort gases, taken from the retort, may be mixed with air for combustion at normal temperature or pre-heated, and may be used for heating the retort. For this purpose the hot combustible retort gases, cooled or uncooled, are led into the heating or combustion chambers surrounding the retort at either the carbonization or final burning zones, or at the distilling zone, and are burnt therein.

The air for combustion to be mixed with the retort gases may be pre-heated in recuperators formed in suitable parts of the brick structure.

The distilling process (the first stage) may take place with or without introduction of gas (among others, steam) into the distilling zone. Such introduction may be particularly important with reference to the recovery of by-products. If, for example, a large recovery of ammonia is desired, steam may be introduced.

In one modification of the invention, using a suitable kind of carbon as raw material, (such as wood or peat charcoal), the same is directly introduced into the carbonization zone (second stage) and the following features are characteristic of the procedure:—

(a) In accordance with the general principle of the invention the process is performed with a single retort or a series of associated retorts constituting a single unit of apparatus.

(b) The several stages of the treatment, including the active carbonization and final burning, and the introduction of gases essential to this particular modification of the invention, follow each other in said retort or series of associated retorts.

(c) The introduction of added gases to the carbonization zone takes place exclusively at the top, that is to say, on the top layers of material in this zone, and the retort or retort system is so heated as to produce the highest temperature at the bottom, with a gradual decrease in temperature towards the top. Accordingly, the added gases successively encounter layers of increasing temperature.

(d) For the purpose set forth under (c) the hot retort gases are discharged from the retort at a place below that at which the added gases enter the final burning zone and these retort gases are introduced into a heating chamber or chambers around the lower part of the retort, and are burnt therein, with air. Preferably the combustion of these gases begin at the lowest part of the retort or retort system, around the final burning zone.

The added gas or steam introduced at the top acquires temperatures approximating to the temperatures of the successive layers in the burning zone, and the endothermic reactions take place wholly (or nearly so) in the carbonization zone, and the chemical action of the gases on the carbon in this zone takes place at the point of highest temperature thereof.

It has been stated hereinbefore that in general the final burning treatment may take place without the passage of added gases through the carbon, or other concurrent treatment.

The process may, however, be so conducted, that the added gases introduced at the upper part of the carbonization zone continue their passage through the remainder of the retorts or retort system under conditions which prevent any deleterious endothermic effect in the final burning zone.

For this purpose, that part of the retort in which the carbonization takes place, is made of such length or height, empirically determined, and the quantity of gas added at the top is so regulated, that the endothermic reactions are completed at a given lower level of the retort but before reaching the final zone, and that the continued passage of the gas through the final burning zone, below this level, has no cooling effect.

With this mode of operation, if a single retort is used, the hot retort gases are discharged at the bottom thereof, that is to say, at the bottom of the final burning zone, and can then be burnt with air in combustion chambers surrounding the final burning zone.

The retort gases from the carbonization zone or from the final burning zone, separately or combined, may be made to pass through the carbonized material in the final burning zone, after or before having been mixed with air and after or before being used for heating purposes.

By the introduction of chlorine at a high temperature zone, for example the final burning zone, in which the carbonized mass is already converted into de-colorizing carbon, the latter is rendered particularly active and pure.

The introduction of gases and vapors into the appropriate parts of the retort, and rapid discharge of the retort gases evolved, are for various reasons desirable for the efficient development of the process.

The discharge or removal of the retort gases may be artificially accelerated, for instance by suction.

For this purpose the retort shaft may be sub-divided, one part thereof being used for the execution of the various stages of the work, and the other part, communicating with the said working part, being used for acceleration discharge of the hot retort gases.

The apertures establishing the communication referred to are made at different levels in the dividing wall, and can be more or less opened and closed as required by means of adjustable shutters.

The section of the retort divided off from the working part as described, may also be used for introducing gases into the retort, suitable pipes being, for example, provided for this purpose.

Direct admission of the gases into the interior of the retort in this manner has the advantage that the gases can be caused to act on the contents of the retort at any desired part or stage of the process.

This effect can also be obtained by providing suitable conduits in the brickwork of the retort, and gas pipes may be laid in such conduits. These conduits may also be used, at the proper places, for the discharge of retort gases from the retort.

Several forms of apparatus according to the invention are shown in the accompanying drawings.

Fig. 1 is a vertical section of a complete installation of apparatus for producing de-colorizing carbon, the material being, in this form of the apparatus, divided into three portions for successive stages of the operation.

Fig. 2 is a vertical section of a retort in which there is no such division of the charge, but in which the retort is vertically divided by an interior partition or wall.

These two forms of apparatus may be used for working in three stages:—Distillation, carbonization, and final burning. The introduction of gas or vapor and the discharge of hot retort gases takes place at appropriate and convenient parts.

Fig. 3 shows a device for closing the apertures shown in the vertical partition (Fig. 2).

Figure 4:
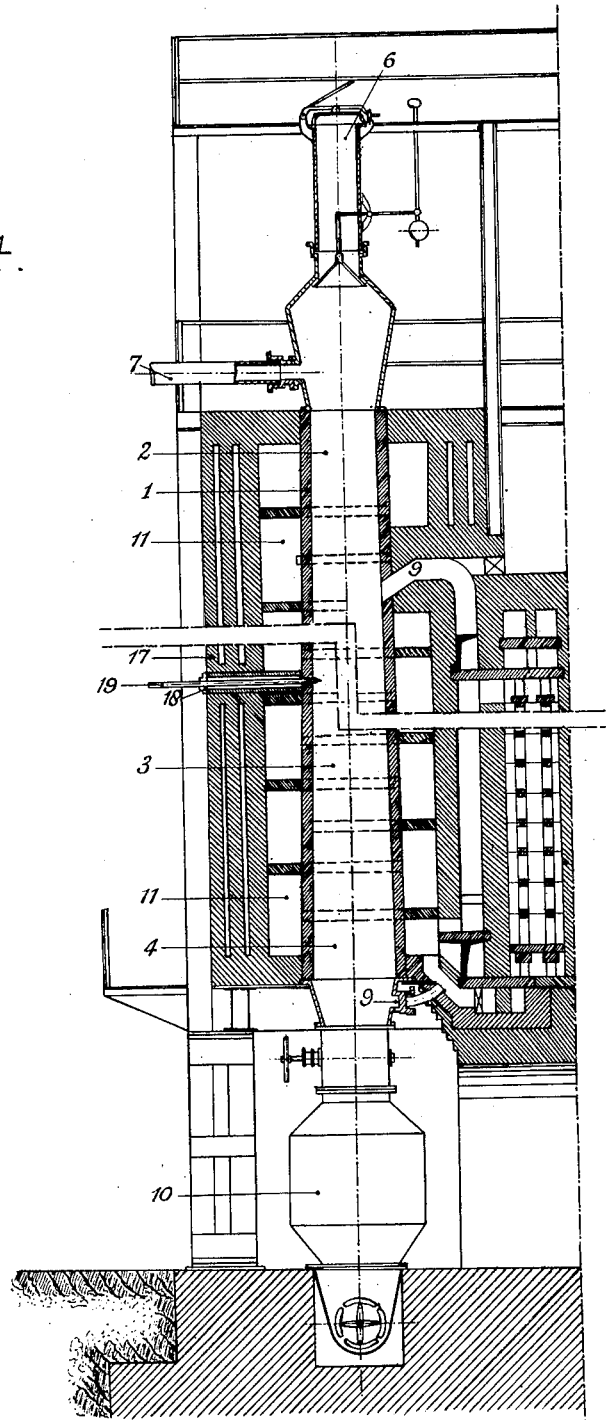

Fig. 4 is a vertical section of a vertical retort (partly broken away) wherein there is no division of the charge, and wherein a duct in the wall is used for introducing gas or steam into the retort.

Figure 5:
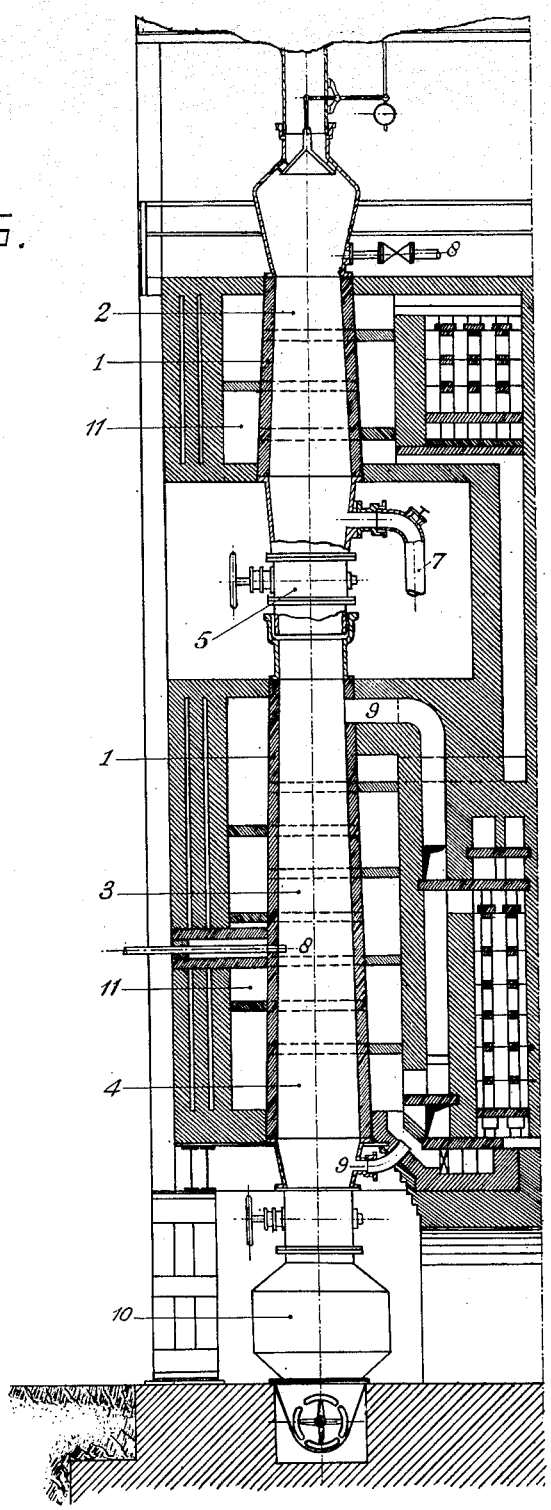

Fig. 5 is a vertical section showing a construction wherein two retorts are associated with each other in a single structure, one above the other, the upper retort being used for distillation and separation of recoverable by-products, and the lower retort serving for the carbonization and final burning processes.

In Figure 1, 1 designates the vertical retort system, over which is a roof, 2 being the uppermost chamber which is charged with the raw material, for example wood, raw peat, charcoal or carbonized peat. 3 designates the chamber wherein the carbonization takes place, and 4 the chamber for the final burning process. The chambers 2, 3, and 4 are separable from each other by slides, sluices or valves, 5, 5, which can be opened to place the chambers in communication with each other. 6 designates the charging hopper, and 7 the pipe through which products of distillation are led out of the chamber 1; 8, 8 are pipes for admission of gases or vapors into the retort, and 9, 9 are conduits for discharge of retort gases. At 10 the finished product (de-colorizing carbon) is collected, before being taken from the apparatus. The retorts are heated by the combustion of gas in heating chambers 11 surrounding the chambers 2, 3 and 4. The whole system is enclosed in a brick wall.

As an example it may be stated that for distillation of wood, peat or like raw material in the chamber 2, a temperature of about 600° C. may be used, with a carbonization temperature of about 1,200° C. in the chamber 3, and a final burning temperature of about 1,500° C. in the chamber 4.

It will be understood that a further subdivision of the chambers 2, 3 and 4 may be effected by means of additional slides, valves or sluices, 5, for the purpose of mechanical regulation of the transition from one stage to the next.

In all cases introduction of gases may be effected at suitable intervals, and similarly discharge or retort gases and return thereof to the apparatus for heating the retort or particular portions thereof.

With the apparatus shown in Fig. 1 the procedure is as follows:—

The heating of the retort being started by any convenient means, and the chamber 2 being charged, the gaseous and vaporous products of distillation are discharged at 7 and suitable gases are introduced through the pipe 8 leading into this chamber.

The discharge of the gaseous and vaporous products of distillation at 7 is effected by their own pressure or by forced draft or suction applied in any convenient manner, for example by forcing in inert or other gases through the pipe 8 connected to the lower part of chamber 2.

When a sufficient separation of products of distillation has taken place, accompanied by carbonization or the raw material, the slide 5 below the chamber 2 is opened and the carbonized material enters the chamber 3, where it is subjected to a higher temperature, ranging, for example, from 1000° C. to 1200° C. or more.

The retort gases evolved are discharged at 9 and may be led into the combustion chambers 11 for heating the chambers 2, 3 and 4. The charge is admitted to the chamber 4 by opening the second slide 5, when the material is ripe for the final burning process.

In Fig. 2, 1' designates a single retort wherein the three stages of the process, designated distillation, carbonization and burning, take place in chambers or zones 2', 3' and 4' respectively, the retort being charged through the hopper 6'. The gaseous products of distillation evolved in the chamber 2' are discharged through a pipe 7'. There is a vertical partition 13 in the retort, forming a vertical duct 14. This partition may extend through the entire length of the shaft, instead of only through a portion thereof. In the duct 14 are pipes 15 connected to pipes 8' for introducing gas into the retort at appropriate places. The partition has apertures 16 for the discharge of retort gases into the duct 14. The purpose of the apertures 16 is to quickly relieve the interior of the retort from the retort gases evolved. The retort gases are taken from the duct 14 through conduits 9' to the combustion chambers 11'. The charge is withdrawn at 10'.

In Fig. 3, 20 designates an appliance whereby the apertures 16 can be more or less closed, as required.

Fig. 4 shows a single retort $1^2$, wherein the three stages of the process take place in chambers $2^2$, $3^2$, and $4^2$ respectively. The retort is charged at $6^2$ and the products of distillation are discharged from the chamber $2^2$ at $7^2$. Gas or steam is introduced into the interior of the retort through a duct 18 in a brickwork 17, with a gas or steam pipe 19 therein, leading horizontally or obliquely to the retort. Retort gases are discharged through ducts $9^2$. The retort gases are burned in combustion chambers $11^2$. The finished carbon is withdrawn at $10^2$.

In Fig. 5 the retort system $1^3$ includes distilling chamber $2^3$, charged through a hopper $6^3$, and separated from the carbonizing and burning chambers $3^3$ and $4^3$ by a valve $5^3$, all those chambers being surrounded by combustion chambers $11^3$. Gases are introduced into the carbonizing chamber $3^3$ through a pipe $8^3$, and are discharged at $9^3$. Gas or steam is introduced into the distilling chamber $2^3$ through another pipe $8^{31}$, and the products of distillation are discharged at $7^3$. The finished carbon is withdrawn at $10^3$.

It is found in practice that some kinds of carbon commercially designated de-colorizing carbon are not suitable for certain purposes for which de-colorizing carbon is required. The reason for this has hitherto been obscure, but I have found that the defects rendering such carbon practically valueless for certain purposes, are partly due to the mechanical treatment applied to the carbon after it leaves the retort, such treatment having the effect of "killing" the carbon, by too finely dividing it. The fact is that some kinds of so-called de-colorizing carbon, no matter what mechanical treatment is adopted, never acquire the structure required for efficiently serving certain purposes, as for example filtration or for being compressed into tablets. In part this is due to the nature of the raw material used.

The structure best suited for filtration purposes, with finely powdered de-colorizing carbon, and for compression, is a fibrous structure. One condition for obtaining such structure in de-colorizing carbon is that the raw material is fibrous, as is the case with wood, for example pine, and another condition is that the subsequent mechanical treatment is so performed as not to break down this fibrous structure and "kill" the carbon in the process of milling, grinding, subdividing or disintegrating.

The importance of the fibrous structure for certain technical purposes is notable, for example, when de-colorizing carbon is used for treating liquids and must be subsequently separated from the liquid, or when the liquid is filtered through a layer of the carbon. The degree of filtration obtained, and the efficiency with which the carbon and liquid can be separated, are largely dependent on the fibrous nature of the structure. This is due to the fact that in carbon "killed" by grinding, the minute particles are too closely packed, and even a thin layer thereof may be wholly or nearly impervious to liquid.

For other purposes also, for example for compressing, without using adhesive, such as glue liable to be absorbed and largely destroy the absorptive power of the carbon, a certain degree of fibrous structure is essential to good results.

It is, in view of these considerations, remarkable that heretofore the grinding of de-colorizing carbon to a degree of fineness which "kills" the carbon has been a more or less generally adopted practice. In part this is probably due to the fact that for certain purposes, for example, the manufacture of boot polish and colors, and also in some branches of the electrical and metal industries, a very high degree of fineness is required; for example, in the paint trade for avoiding streakiness of colors.

According to my invention the grinding of the so-called de-colorizing carbon is effected by means of suitable mechanical appliances, for example, a ball mill, disintegrator or the like, used in such a way that the carbon retains its fibrous structure after the grinding. With a disintegrator, for example, this is effected by suitably adjusting the discs.

What I claim as my invention and desire to secure by Letters Patent of the United States is:—

1. The process for the manufacture of decolorizing carbon, which consists in subjecting carbonaceous material in a practically continuous manner to at least two successive operations one of which includes a carbonizing stage during which the material is treated, under the application of heat, with activating gases, such activating gases being introduced and withdrawn continuously, and the treatment being continued without interruption until completed.

2. A process such as set forth in claim 1, in which the material travels downwardly while undergoing the successive operations.

3. A process such as set forth in claim 1, in which the carbonization stage is preceded by a distillation stage performed at a lower temperature than said carbonization stage, and in which the carbonization stage is followed by a burning stage conducted at a higher temperature than the carbonization stage, but without endothermic reactions, all three stages being performed uninterruptedly until the material is in its final condition.

4. A process such as set forth in claim 1, in which the carbonization is preceded by a distillation stage performed at a lower temperature than said carbonization stage, and in which the carbonization stage is followed by a burning stage conducted at a higher temperature than the carbonization stage, the gases evolved in the burning stage being burned after withdrawal from such stage, for heating the material undergoing treatment, and some part of said evolved gases being thereupon passed through the material in said burning stage.

5. A process such as set forth in claim 1, in which carbonaceous material of a distillable character travels downwardly while undergoing the successive operations, and in which the carbonization stage is preceded by a distillation stage, and in which the activating gases are introduced at the lower portion of the carbonization stage and caused to travel upwardly through the material undergoing treatment.

6. A process such as set forth in claim 1, in which carbonaceous material of a distillable character travels downwardly while undergoing the successive operations, and in which the carbonization stage is preceded by a distillation stage, and in which the activating gases are introduced at the lower portion of the carbonization stage and caused to travel upwardly through both of said stages and to be discharged from the distillation stage together with the gaseous and vaporous products of the distillation.

7. A process such as set forth in claim 1, in which the activating gases are introduced at one zone of the material under treatment, while the gases produced in such zone are withdrawn at a different zone of the material.

In witness whereof I have signed this specification.

JOHAN NICOLAAS ADOLF SAUER.